(12) United States Patent
Krupa et al.

(10) Patent No.: US 10,078,157 B2
(45) Date of Patent: Sep. 18, 2018

(54) IRRIGATION GAUGE DEVICE

(71) Applicant: Apurk Ltd., Bolton (CA)

(72) Inventors: Marek Krupa, Brampton (CA); Adam Krupa, Bolton (CA); Karol Krupa, Toronto (CA); Tomasz Krupa, Bolton (CA)

(73) Assignee: Apurk Ltd., Bolton, Ontario (CA)

( * ) Notice: Subject to any disclaimer, the term of this patent is extended or adjusted under 35 U.S.C. 154(b) by 86 days.

(21) Appl. No.: 15/426,426

(22) Filed: Feb. 7, 2017

(65) Prior Publication Data
US 2017/0146693 A1    May 25, 2017

Related U.S. Application Data

(63) Continuation of application No. PCT/CA2015/050742, filed on Aug. 6, 2015.

(60) Provisional application No. 62/034,223, filed on Aug. 7, 2014.

(51) Int. Cl.
*G01W 1/14*    (2006.01)
(52) U.S. Cl.
CPC .................................. *G01W 1/14* (2013.01)
(58) Field of Classification Search
None
See application file for complete search history.

(56) References Cited

U.S. PATENT DOCUMENTS

| | | | |
|---|---|---|---|
| 2,468,692 A | 4/1949 | Stevens | |
| 3,926,143 A | 12/1975 | Hothan | |
| 7,159,455 B1 * | 1/2007 | Leonard | G01W 1/14 73/170.17 |
| 7,181,961 B1 | 2/2007 | Hill | |
| 7,536,907 B1 * | 5/2009 | Peterson | G01W 1/14 73/170.22 |
| 7,543,493 B2 | 6/2009 | Geshwender | |
| 9,010,182 B1 * | 4/2015 | Glenn | G01W 1/14 73/170.22 |
| 9,335,440 B1 * | 5/2016 | Glenn | G01W 1/14 |
| 9,606,262 B1 * | 3/2017 | Caldwell | G01W 1/14 |
| 2008/0184788 A1 * | 8/2008 | Jeong | G01W 1/14 73/170.21 |

(Continued)

FOREIGN PATENT DOCUMENTS

CN    2833628    11/2006

OTHER PUBLICATIONS

World's Coolest Rain Gauge, http://www.worldscoolestraingauge.com/ retrieved Jun. 24, 2014.

(Continued)

*Primary Examiner* — Andre Allen
(74) *Attorney, Agent, or Firm* — Rowand LLP

(57) ABSTRACT

A water collection device is described. In one embodiment, a water collection device includes a collection tube having an inner wall, an open mouth at its upper end, and a closed bottom end, the bottom end including an upwardly projecting sidewall defining an interior projection at least partly spaced apart from the inner wall. The water collection device also includes a float within the collection tube. The float has an upper end and a lower end, the lower end having an axial bore sized to fit over the interior projection defined by the upwardly projecting sidewall.

20 Claims, 10 Drawing Sheets

(56) References Cited

U.S. PATENT DOCUMENTS

2008/0223126 A1* 9/2008 Geschwender ......... G01W 1/14
                                                                73/170.17

OTHER PUBLICATIONS

International Search Report and Written Opinion relating to PCT application No. PCT/CA2015/050742, dated Nov. 2, 2015.

* cited by examiner

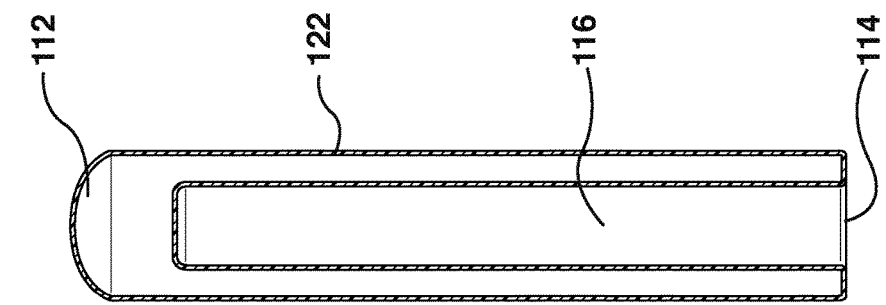
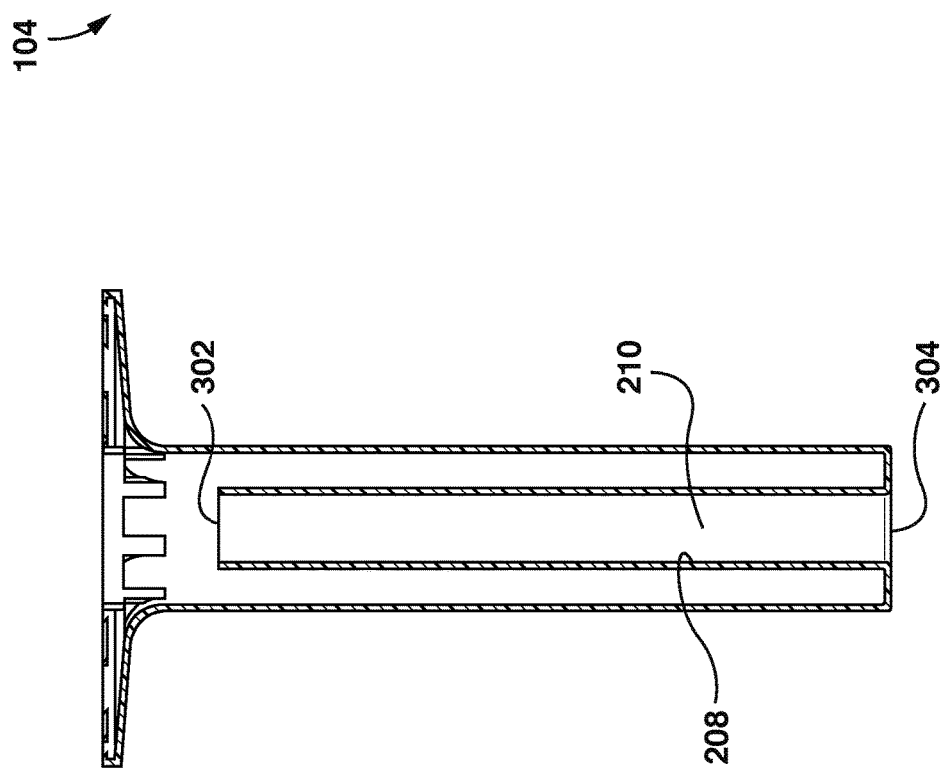
FIG. 4
FIG. 3

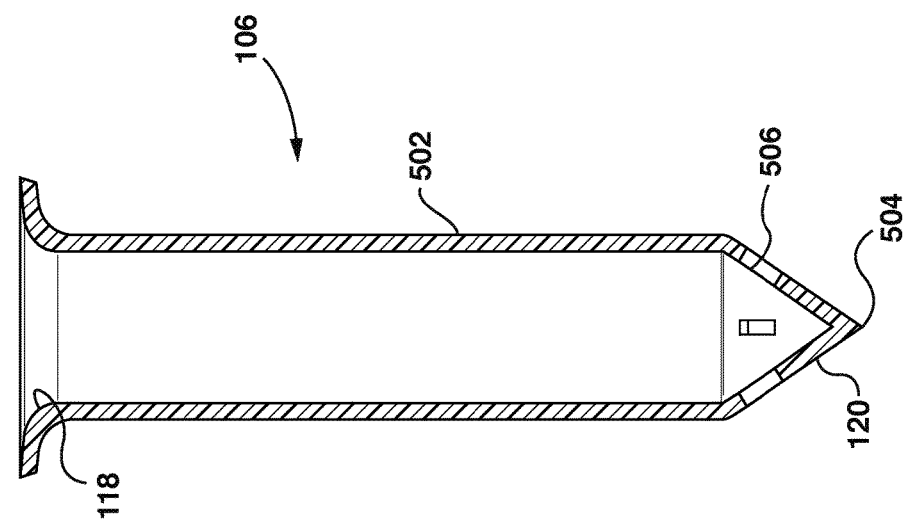
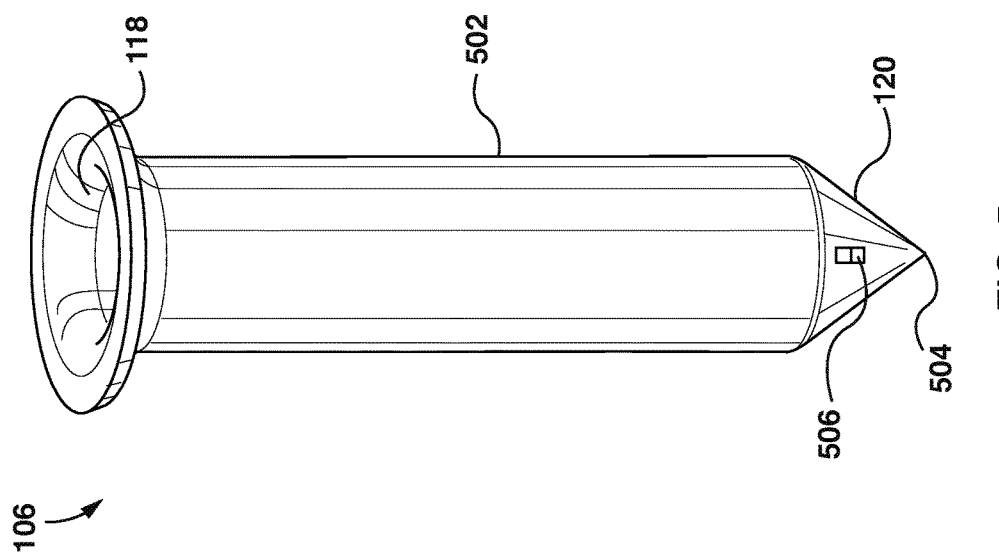

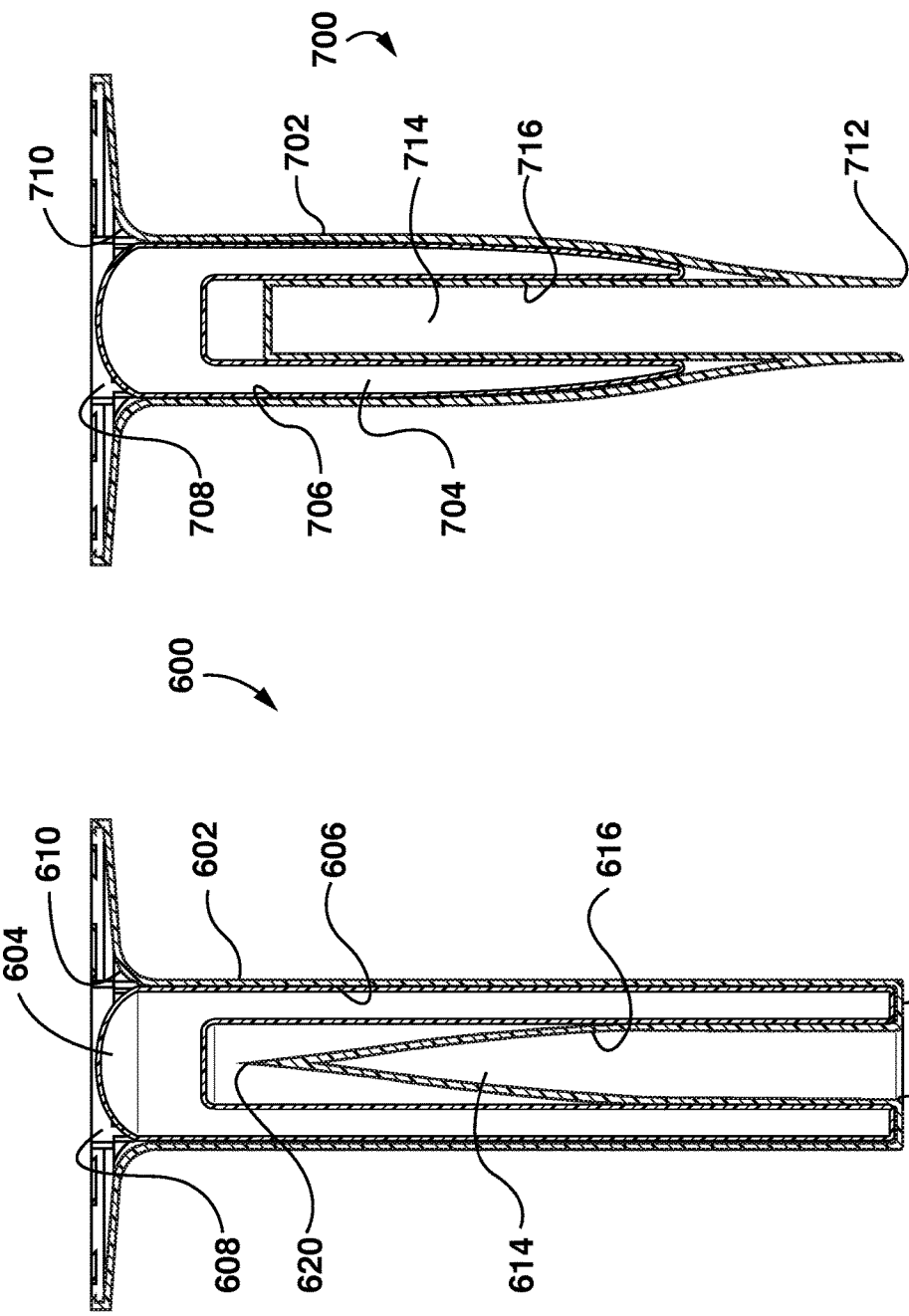

IRRIGATION GAUGE DEVICE

CROSS-REFERENCE TO RELATED APPLICATIONS

The present application is a continuation of PCT/CA2015/05074, filed Aug. 6, 2015, and designating the United States, and which claims priority to U.S. Provisional patent application Ser. No. 62/034,223, filed Aug. 7, 2014, the contents of both of which are hereby incorporated by reference.

FIELD

The present application relates to water measuring systems and, more particularly, to an in-ground water collection device.

BACKGROUND

A typical rain gauge is a transparent or translucent container with an open top and having markings on its exterior surface to measure the water level in the container. A user visually determines the level of rainfall by peering through the side of the container to discern the amount of water collected.

Many gardeners and homeowners enjoy displaying decorative outdoor ornaments such as garden statuettes and figurines, which may add to the aesthetic appeal of a garden.

It would be advantageous to provide for a water collection device that indicates the level of rainfall and, optionally, that has aesthetic or decorative appeal.

BRIEF DESCRIPTION OF THE DRAWINGS

Reference will now be made, by way of example, to the accompanying drawings which show example embodiments of the present application, and in which:

FIG. 3 shows a cross-sectional view of the collection tube of FIG. 1A.

FIG. 4 shows a cross-sectional view of the float of FIG. 1A.

FIG. 5 shows a perspective view of the insertion spike of FIG. 1A.

FIG. 6 shows a cross-sectional view of the insertion spike of FIG. 1A.

FIG. 7 shows another embodiment of the water collection device.

FIG. 8 shows another embodiment of the water collection device.

Like reference numerals are used in the drawings to denote like elements and features.

DETAILED DESCRIPTION

In one example embodiment, the present application describes a water collection device. The water collection device includes a collection tube having an inner wall, an open mouth at its upper end, and a closed bottom end. The bottom end includes an upwardly projecting sidewall which defines an interior projection at least partly spaced apart from the inner wall of the collection tube. The cross-sectional area between the inner wall and the upwardly projecting sidewall is smaller than the cross-sectional area of the open mouth. The water collection device also includes a float within the collection tube. The float has an upper end and a lower end. The lower end of the float has an axial bore sized to fit over the interior projection defined by the upwardly projecting sidewall of the collection tube.

In another aspect, the present application describes an in-ground water measurement device. The device includes an insertion spike including a tube with a closed conical lower end for insertion into soil; a collection tube sized to slide into the insertion spike and having an inner wall with an open mouth at its upper end and a closed bottom end, the bottom end including an upwardly projecting sidewall defining an interior projection at least partly spaced apart from the inner wall of the collection tube, wherein the cross-sectional area between the inner wall and the upwardly projecting sidewall is smaller than the cross-sectional area of the open mouth; and a buoyant float having an upper end and a lower end, the lower end having an axial bore sized to fit over the interior projection defined by the upwardly projecting sidewall, the buoyant float including measurement markings along its exterior surface to indicate the quantity of water in the collection tube.

Other aspects and features of the present application will be understood by those of ordinary skill in the art from a review of the following description of examples in conjunction with the accompanying figures.

Figure 1A:
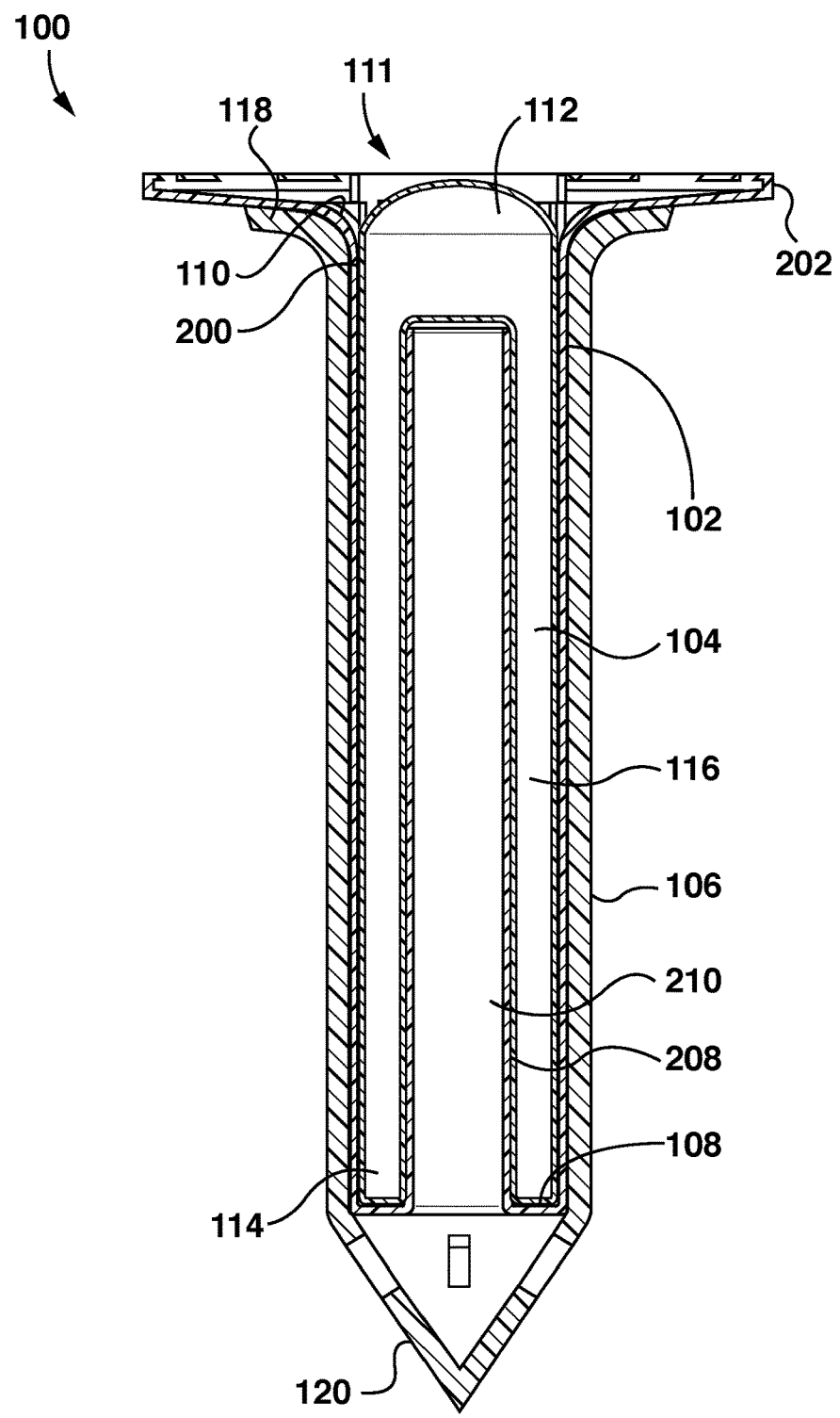
FIG. 1A shows a cross-sectional view of an example water collection device, including a collection tube, a float and a sleeve, in accordance with example embodiments of the present disclosure.
Figure 1B:
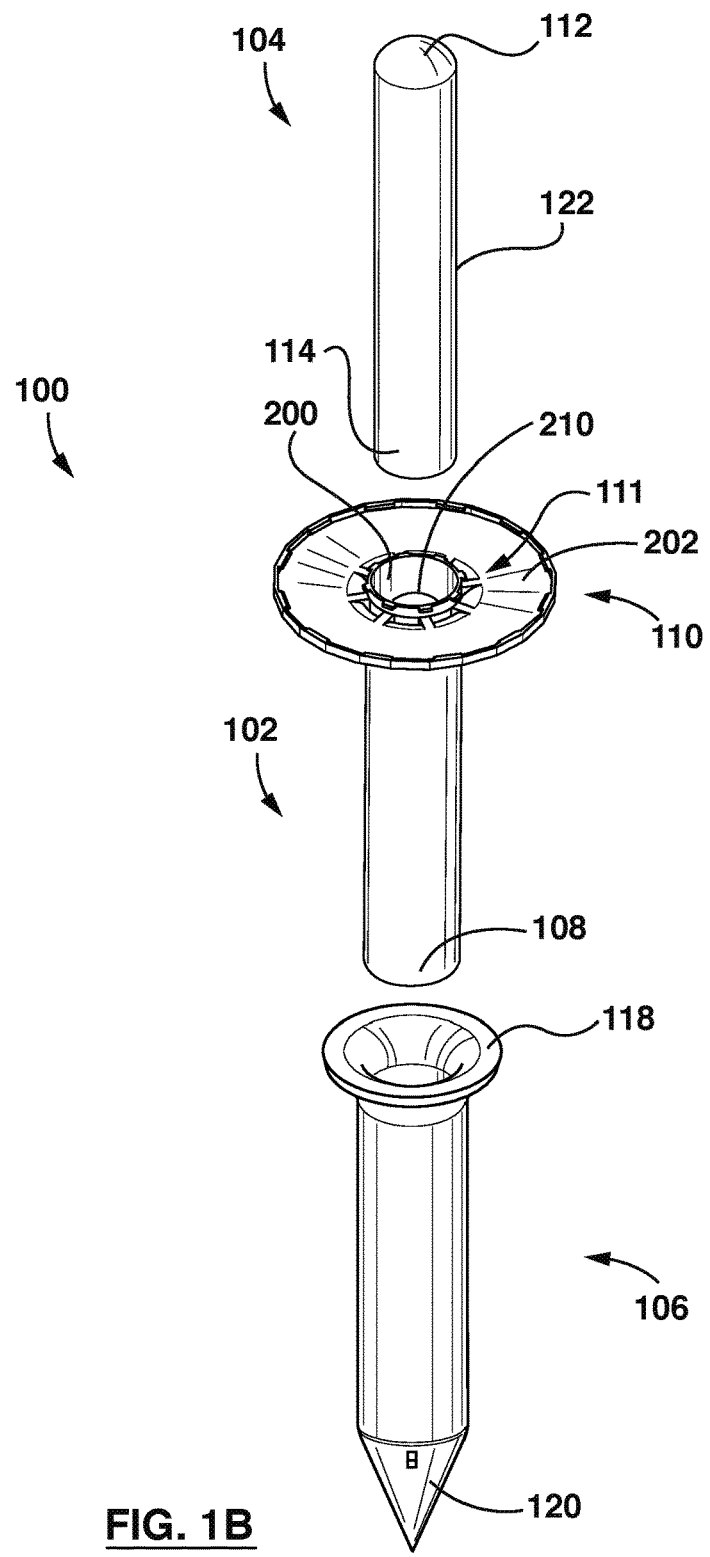
FIG. 1B shows an exploded perspective view of the water collection device of FIG. 1A.

Reference is first made to FIG. 1A, which shows a longitudinal cross-sectional view of an example water collection device 100, and FIG. 1B, which shows an exploded perspective view of the water collection device 100. The water collection device 100 includes a collection tube 102. The collection tube 102 is elongate and generally tube-shaped. The collection tube 102 is adapted to receive a float 104, which will be described in greater detail below. The collection tube 102 has an inner wall 200, a closed bottom end 108 and an open mouth 111 at its upper end 110. The open mouth 111 allows the float 104 to protrude from the collection tube 102, exposing at least a portion of the float 104. For example, as water is received and collected in the collection tube 102, the collected water may cause the float 104 to be displaced along a longitudinal axis of the collection tube 102 in an upward direction.

In the example of FIGS. 1A and 1B, the upper end 110 of the collection tube 102 is extended above the open mouth 111 and is flared outward to form a funnel portion 202. For example, as in the illustrated embodiment, the funnel portion 202 may comprise a disk-like plate. In at least some embodiments, the cross-sectional area of the funnel portion 202 may be greater than the cross-sectional area of the open mouth 111.

In at least some embodiments, the bottom end 108 of the collection tube 102 includes an upwardly projecting sidewall 208 that defines an interior projection 210 at least partly spaced apart from the inner wall 200 of the collection tube 102. The interior projection 210 is located in the interior of the collection tube 102. In the example of FIGS. 1A and 1B, the interior projection 210 is centrally located within the collection tube 102. More specifically, the interior projection 210 is centered about a central axis of the collection tube 102, the central axis being located at the center of a cross-section of the collection tube 102 and being generally parallel with the inner wall 200.

The example interior projection 210 is generally tube-shaped. In the illustrated example, the interior projection 210 has uniform cross-section along its height. In some embodiments, the cross-sectional area of the interior projection 210 may vary along its height. The cross-sectional area of the open area within the collection tube 102 is reduced by the cross-sectional area of the interior projection 210. In particular, in at least some embodiments, the cross-sectional area between the inner wall 200 of the collection tube 102 and the upwardly projecting sidewall 208 is smaller than the cross-sectional area of the open mouth 111.

The float 104 is elongate and generally tube-shaped. The float 104 is adapted to fit inside the collection tube 102. That is, any cross-sectional area of the float 104 is smaller than any cross-sectional area of the collection tube 102 along the height of the collection tube 102. The float 104 may have a height that is different from the height of the collection tube 102. For example, in the embodiment of FIG. 1, the height of the float 104 is less than the height of the collection tube 102.

The float 104 has an upper end 112 and a lower end 114. In the example illustrated, the upper end 112 is dome-shaped. It will be appreciated that the upper end 112 of the float 104 could, in other embodiments, have a shape that differs from what is shown in FIGS. 1A and 1B. The lower end 114 of the float 104 has an axial bore 116. In the example of FIGS. 1A and 1B, the axial bore 116 is elongate and generally tube-shaped, and extends upward from the lower end 114 in the interior of the float 104. In some embodiments, the axial bore 116 may be centered about a vertical axis of the float 104. For example, the axial bore 116 may be centered about a central axis of the float 104. In other examples, the bore may not be centered and may include an opening in the sidewall of the float 104 (not shown).

In at least some embodiments, the axial bore 116 may be sized to fit over the interior projection 210 defined by the upwardly projecting sidewall 208 of the collection tube 102. That is, at least part of the interior projection 210 of the collection tube 102 may fit inside the hollow portion of the float 104 created by the axial bore 116. For example, the cross-sectional area of at least part of the interior projection 210 may be less than the cross-sectional area of the axial bore 116. Further, the height of the interior projection 210 may be different from the different of the axial bore 116. For example, in the embodiment illustrated in FIG. 1, the height of the interior projection 210 is less than the height of the axial bore 116.

The water collection device 100 in this example also includes an installation spike 106. In at least some embodiments, the spike 106 comprises a tube having an open top end 118 and a closed bottom end 120. In the example illustrated, the spike 106 is elongate and generally tube-shaped. In some embodiments, the spike 106 may be configured to be inserted into soil. For example, the body of the spike 106 may be inserted into the ground, such as into soil, sand, sod or the like. In at least some embodiments, the closed bottom end 120 of the spike 106 may comprise an angled wall to enable insertion into the ground. For example, as illustrated in FIGS. 1A and 1B, the angled wall of the bottom end 120 of the spike 106 may comprise an inverted cone. The shape of the inverted cone, with a sharp vertex and the angled wall of the bottom end 120 tapering smoothly from the vertex, may make the spike 106 better suited for insertion into the ground. In at least some embodiments, the bottom end 120 of the spike 106 may include one or more drainage holes. That is, the bottom end 120 may include one or more holes to allow water to flow out from the spike 106, for example, into soil. For example, the one or more drainage holes may be located on the angled wall of the bottom end 120.

The spike 106 is adapted to receive the collection tube 102. That is, any cross-sectional area of the spike 106 along its height is greater than any cross-sectional area of the collection tube 102 along the height of the collection tube 102. In some embodiments, a cross-section of the spike 106 may have the same shape as a cross-section of the collection tube 102.

The spike 106 may be installed in-ground by, for example, being driven into a surface of the ground to a desired depth. The bottom end 120 of the spike 106 may be placed on the surface of the ground and a downward force applied to the top end 118 such that the spike 106 is driven into the ground. For example, a hammer or similar device may be used to provide enough downward force to the top end 118 of the spike 106 such that the bottom end 120 breaks the surface of the ground and is gradually driven into the ground. In at least some embodiments, the spike 106 may be driven into the ground to such depth as to allow the open top end 118 of the spike 106 to be substantially flush with the surface of the ground. In some other embodiments, the spike 106 may be driven to such depth so that the top end 118 is below the surface of the ground.

The collection tube 102 can be inserted into the spike 106 once the spike has been driven into the ground. In other embodiments, the collection tube 102 can be inserted into the spike 106 before the combination of collection tube 102 and spike 106 is driven into the ground. For example, the collection tube 102 may be dropped or slid into the spike 106. In the example illustrated, the collection tube 102 is inserted into the spike 106 such that the funnel portion 202 comes to rest on the top end 118 of the spike 106. In other embodiments, the funnel portion 202 may rest above the top end 118 when the collection tube 102 is fully inserted into the spike 106.

The float 104 can be inserted into the collection tube 102 once the spike 106 and the collection tube 102 have been installed in the ground. In other embodiments, the float 104 can be inserted into the collection tube 102 before inserting the combination of float 102 and collection tube 102 into the spike 106. The float 104 may be dropped or slid into the collection tube 102 such that the axial bore 116 fits over the interior projection 210 of the collection tube 102. In some embodiments, the float 104 may be inserted to such depth so that the upper end 112 of the float 104 is below the open mouth 111 of the collection tube 102. That is, the float 104 may be inserted so that it is completely submerged inside the collection tube 102. In other embodiments, the upper end 112 of the float 104 may be substantially flush with the open mouth 111 of the collection tube 102 when it is fully inserted. In yet other embodiments, at least part of the upper end 112 of the float may protrude from the open mouth 111 of the collection tube 102 when it is fully inserted.

Once it is installed in the ground, the water collection device 100 can receive and collect water from natural rainfall and artificial sources, such as sprinkler systems. The funnel portion 202 is adapted to collect water and channel the collected water into the collection tube 102 through the open mouth 111. For example, water may be channeled into the space between the inner wall 200 and the float 104 within the collection tube 102. As water collects in the collection tube 102, the collected water may cause the float 104 to be displaced upward along a longitudinal axis of the collection tube 102. This displacement may cause the float 104 to protrude from the open mouth 111 of the collection tube 102, exposing at least a portion of the float 104.

In one embodiment, the exposed portion of the float 104 may contain a plurality of graduated markings on an exterior surface 122 of the float 104, the graduated markings indicating how much water has been collected in the collection tube 102. For example, a measure of the amount of water collected in the collection tube 102 may be read directly from the graduated markings by determining the position of the open mouth 111 along the visible markings on the float 104 that are exposed over the upper end 110 of the collection tube 102. Accordingly, graduated markings that are higher along the exterior surface 122 of the float 104 correspond to smaller volumes of collected water and graduated markings that are lower along the exterior surface 122 of the float 104 correspond to larger volumes of collected water.

In another embodiment, the float 104 does not have any markings for measurement purposes and does not function as a rain gauge, but is a decorative or novelty item instead. In such an embodiment, the float 104 may be shaped into a character or animal, such as a worm or other creature. Accordingly, when the water collection 102 collects rainfall, the "creature" emerges from the lawn or garden.

Advantageously, the collection tube 102 is easily extracted from the spike 106 and emptied, if desired.

When no or little rainfall is in the collection tube 102, the float 104 is in its retracted position with little or no portion of it protruding from the collection tube 102. This allows the water collection device 100 be installed in-ground in a lawn or garden without it having to be removed during maintenance, e.g. lawn mowing.

Collection Tube

Figure 2:
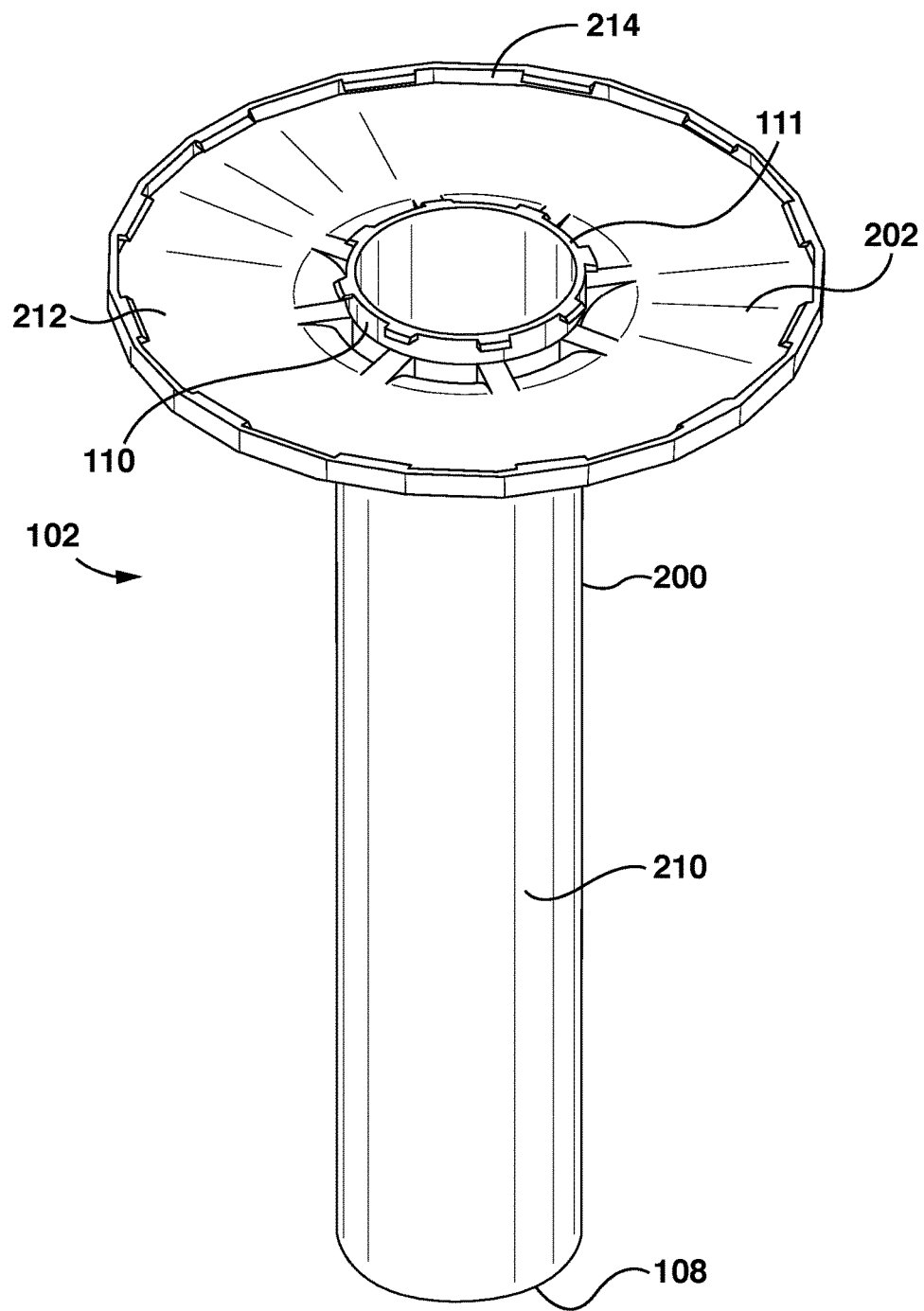
FIG. 2 shows a perspective view of the collection tube of FIG. 1A.

Reference is now made to FIG. 2, which shows a perspective view of the example collection tube 102 of FIG. 1. The example collection tube 102 will now be described in greater detail. In at least some embodiments, the collection tube 102 may be elongate and tube-shaped. In the example illustrated, the collection tube 102 is generally cylindrical and has a circular axial cross-section. In the example illustrated, the open mouth 111 has a circular cross-section. It will be appreciated that the collection tube 102 or the open mouth 111, or both, could, in other embodiments, have shapes that differ from what is shown in FIG. 2. For example, in some embodiments, the collection tube 102 may have a rectangular cross-section instead of the circular cross-section in the example embodiment of FIG. 2.

The collection tube 102 has an inner surface defined by the inner wall 200. This inner wall 200 may extend from the upper end 110 to the bottom end 108 of the collection tube 102. In at least some embodiments, the bottom end 108 of the collection tube 102 may include an upwardly projecting sidewall 208 which defines an interior projection 210. In some embodiments, the interior projection 210 may be at least partly spaced apart from the inner wall 200 of the collection tube 102. That is, the cross-sectional area between the inner wall 200 and the upwardly projecting sidewall 208 may be smaller than the cross-sectional area of the open mouth 111. For example, in the example illustrated, the cross-section of the interior space of the collection tube 102 between the inner wall 200 and the upwardly projecting sidewall 208 is an annulus, the annulus having an inner radius equal to the radius of the cross-section of the interior projection 210. This annulus has an area which is less than the cross-sectional area of the open mouth 111, because the area of the annulus, at a fixed height of the collection tube 102, is equal to the cross-sectional area of the collection tube 102 at the height, which, in this example, has the same cross-sectional area as the open mouth 111, minus the cross-sectional area of the interior projection 210 at the same height.

In some embodiments, the upper end 204 of the collection tube 102 may be extended above the open mouth 111 and flare outward to form the funnel portion 202. In at least some embodiments, the funnel portion 202 may comprise an angled wall. In particular, the portion of the collection tube 102 that is flared outward and extended above the open mouth 111 may create an angled wall. The funnel portion 202 may have a greater cross-sectional area than the open mouth 111 at the upper end 204 of the collection tube 102. In the example illustrated, the funnel portion 202 comprises a disk-like plate 212, the disk-like plate including a perpendicular wall 214 along its perimeter. The greater surface area defined by the disk-like plate 212 of the funnel portion 202 and enclosed by the perpendicular wall 214 may allow a greater volume of water to be collected and channeled into the collection tube 102 than can be collected and channeled by the open mouth 111 without the funnel portion 202, the open mouth 111 having a smaller surface area than the disk-like plate 212. Collecting a larger volume of water in the collection tube 102 may allow the effect of upward displacement of the float 104 to be more pronounced despite a relatively small level of rainfall, thereby facilitating the visual determination of an amount of water collected or improving the visual impact of the protruding decorative "creature".

Reference is now made to FIG. 3, which shows a cross-sectional view of the collection tube 102 of FIG. 1. The interior projection 210 has a top end 302 and a base 304. In at least some embodiments, the sidewall 208 may be sloped such that the cross-sectional area of the interior projection 210 gradually increases from its top end 302 to its base 304. That is, the cross-section of the interior projection 210 may not be uniform along the height of the interior projection 210. In particular, the cross-sectional area of the top end 302 may be less than the cross-sectional area of the base 304.

In the example illustrated, the interior projection 210 is tube-shaped and is centrally located within the collection tube 102. That is, the interior projection 210 extends upward from the bottom end 108 of the collection tube 102 and is centered about a central axis of the collection tube 102, the central axis being located at the center of a cross-section of the collection tube 102 and being generally parallel with the inner wall 200. In some embodiments, the height of the interior projection 210 may be less than the height of the collection tube 102.

In some embodiments, the water collection device 100 may further comprise a filter screen (not shown) disposed over the funnel portion 202. For example, a filter screen having a circular cross-section and adapted to fit over the disk-like plate 212 of the funnel portion 202 may be placed over the funnel portion 202. The filter screen may contain one or more holes to allow water to flow into the funnel portion 202.

The collection tube 102 is, in at least some embodiments, constructed of a rigid material, such as plastic.

Float

Reference is now made to FIG. 4, which shows a cross-sectional view of one embodiment of the float 104 of FIG. 1. In some embodiments, the float 104 may be formed from a buoyant material. In one example, the float 104 may be constructed from closed cell Styrofoam. In other embodiments, the float 104 may be constructed from other material, including plastic, provided the float 104 itself is buoyant. The markings on the exterior of the float 104 for indicating the quantity of rainfall or other irrigation may take into account whether the combined float 104 and collection tube 102 result in displacement of any significant quantity of collected water before the float 104 is afloat.

The float 104 is elongate and generally tube-shaped. In the example illustrated, the cross-section of the float 104 is uniform along the height of the float 104. The shape of the upper end 112 may be different from the shape of the lower end 114. For example, in FIG. 4, the upper end 112 has a dome shape, while the lower end 114 comprises a flat, horizontal bottom.

In the example illustrated, the axial bore 116 is tube-shaped and extends upward from the lower end 114 in the interior of the float 104. In some embodiments, the axial bore 116 may be cylindrical. The cross-sectional area of the axial bore 116 is less than the cross-sectional area of the float 104. The height of the axial bore 116 is also less than the height of the float 104. The axial bore 116 is sized to fit over the interior projection 210 (FIG. 1A) defined by the upwardly projecting sidewall 208 (FIG. 1A) of the collection tube 102 (FIG. 1A).

In some embodiments, the exterior surface 122 of the float 104 may include a plurality of graduated markings disposed between its upper end 112 and its lower end 114 to indicate an amount of water collected in the collection tube 102. For example, the graduated markings may indicate a volume of water collected in the collection tube 102. In some embodiments, the plurality of graduated markings may not be evenly spaced apart. That is, the graduated markings may be disposed along the height of the float 104 according to a non-linear scale. For example, adjacent graduated markings that are disposed higher along the exterior surface 122 of the float 104 may be further apart than adjacent graduated markings that are disposed lower along the exterior surface 122. Since graduated markings that are disposed lower on the exterior surface 122 of the float 104 correspond to larger volumes of collected water, such non-linear scale of markings may allow for more precise measurements when large volumes of water have been collected in the collection tube 102. In some embodiments, the float 104 may be constructed from a phosphorescent material so that it "glows-in-the-dark", which may aid in viewing the measurements in dim light conditions, for example if a homeowner is attempting at dusk or dawn to determine whether to water.

Insertion Spike

Reference is now made to FIG. 5, which shows a perspective view of one embodiment of the spike 106 of FIG. 1. In the example illustrated, the spike 106 is generally cylindrical and tube-shaped. The spike 106 comprises a main cylindrical body 502, an open top end 118 and a closed bottom end 120. In some embodiments, as in FIG. 5, the top end 118 of the spike 106 may be flared outward to form an annular rim with a greater cross-sectional area than the main cylindrical body 502. The bottom end 120 of the spike 106 may comprise an angled wall. For example, in FIG. 5, the angled wall of the bottom end 120 comprises an inverted cone. The angled wall tapers smoothly from the main cylindrical body 502 to a vertex 504, forming an inverted cone. This shape of the bottom end 120 may facilitate inserting the spike 106 into the ground. The bottom end 120 may also contain one or more drainage holes 506. That is, the bottom end 120 may contain one or more holes to allow water to flow out from the spike 106. In some embodiments, the one or more drainage holes 506 may be located on the angled wall of the bottom end 120.

Reference is now made to FIG. 6, which shows a cross-sectional view of the spike 106 of FIG. 1. In the example illustrated, the spike 106 is generally tube-shaped and has uniform cross-section along the height of the spike 106. The spike 106 is adapted to receive the collection tube 102. Thus, in at least some embodiments, the spike 106 has a cross-sectional area that is greater than the cross-sectional areas of at least some part of the collection tube 102. In the example of FIG. 1, the cross-sectional area of the spike 106 is greater than the cross-sectional area of the collection tube 102 at any point along the height of the collection tube 102.

In the example of FIG. 6, the top end 118 of the spike 106 is flared outward to form an annular rim above the main cylindrical body 502, the annular rim having a greater cross-sectional area than the spike 106. In particular, the radius of the outer circle of the annular rim is greater than the radius of the spike 106.

FIG. 7 shows another embodiment of a water collection device 600. The water collection device 600 includes a collection tube 602 and a float 604 within the collection tube 602. The collection tube 602 has an inner wall 606, an open mouth 608 at its upper end 610, and a closed bottom end 612. The collection tube 602 is generally tube-shaped and has uniform cross-sectional area along its height. The bottom end 612 of the collection tube 602 includes an upwardly projecting sidewall 616 defining an interior projection 614 at least partly spaced apart from the inner wall 606 of the collection tube 602, wherein the cross-sectional area between the inner wall 606 and the upwardly projecting sidewall 616 is smaller than the cross-sectional area of the open mouth 608. The interior projection 614 of the collection tube 602 does not have uniform cross-sectional area along its height. In particular, the sidewall 616 is sloped such that the cross-sectional area of the interior projection 614 decreases gradually along its height, from its base 618 to its top end 620. Consequently, the cross-sectional area between the inner wall 606 and the upwardly projecting sidewall 616 decreases along the height of the collection tube 602, from the upper end 610 to the bottom end 612.

FIG. 8 shows yet another embodiment of a water collection device 700. The water collection device 700 includes a collection tube 702 and a float 704 within the collection tube 702. The collection tube 702 has an inner wall 706, an open mouth 708 at its upper end 710, and a closed bottom end 712. The bottom end 712 of the collection tube 702 includes an upwardly projecting sidewall 716 defining an interior projection 714 at least partly spaced apart from the inner wall 706 and the upwardly projecting sidewall 716, wherein the cross-sectional area between the inner wall 706 and the upwardly projecting sidewall 716 is smaller than the cross-sectional area of the open mouth 708. The collection tube 702 does not have uniform cross-sectional area along its height. In particular, the inner wall 706 is sloped such that the cross-sectional area of the collection tube decreases gradually from its top end 710 to its bottom end 712. The interior projection 714 is generally tube-shaped and has uniform cross-sectional area along its height. Consequently, the cross-sectional area between the inner wall 706 and the upwardly projecting sidewall 716 decreases along the height of the collection tube 702, from the upper end 710 to the bottom end 712. In other words, the open area between the inner wall 706 and the interior projection 714 is narrower at a lower height along the collection tube 702 than at a higher height. This means that a first volume of water received in the collection tube 702 will cause the float 704 to be displaced in an upward direction by a greater distance than a second volume of water, equal to the first volume of water, received after the first volume of water.

Figure 10:
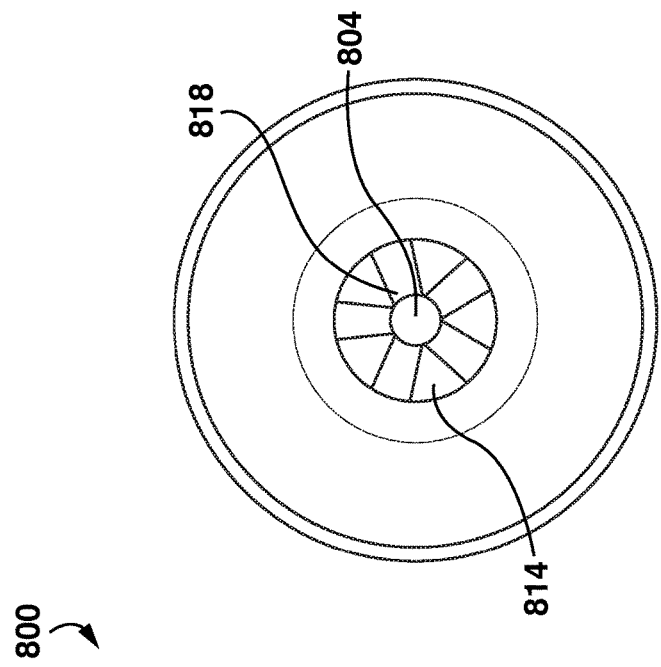
FIG. 10 shows a top view of the embodiment of FIG. 9.
Figure 9:
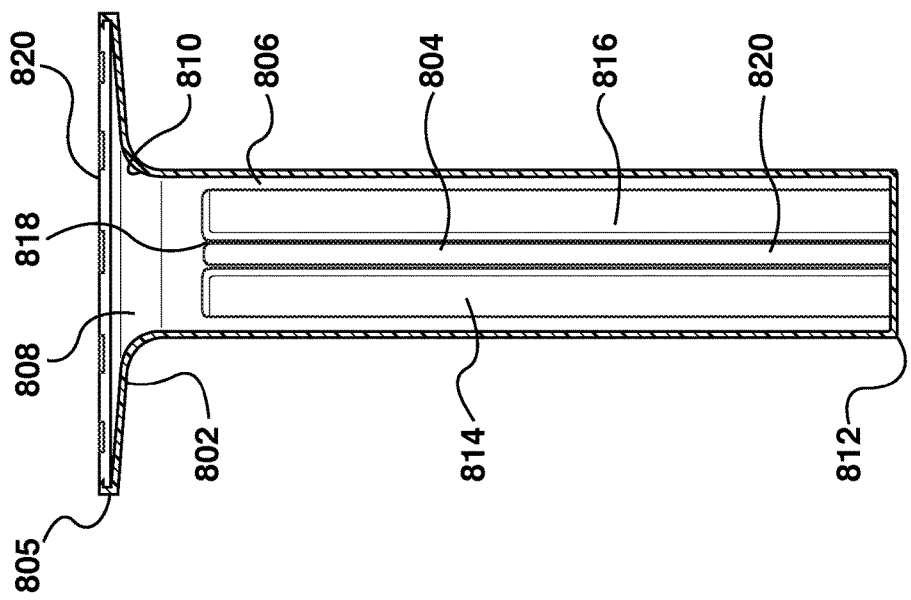
FIG. 9 shows another embodiment of the water collection device.

FIG. 9 shows a further embodiment of a water collection device 800. The water collection device 800 includes a collection tube 802 and a float 804 within the collection tube 802. FIG. 10 shows a top view of the device 800 of FIG. 9. The collection tube 802 has an inner wall 806, an open mouth 808 at its upper end 810, and a closed bottom end 812. The collection tube 802 is generally cylindrical and the upper end 810 of the collection tube 802 is extended above the open mouth 808 and is flared outward to form a funnel portion 805. The inner wall 806 includes a plurality of inwardly projecting sidewalls 816 defining a plurality of interior projections 814.

The interior projections 814 serve to reduce the volume of open space in the collection tube 802 so as to amplify the vertical impact of collected rainwater. The float 804 in this embodiment is a solid cylinder co-axial with the collection tube 802. The plurality of interior projections 814 do not converge at the central axis of the collection tube 802, leaving a column of open space 818 in which the float 804 sits. The float 804 in this example has a main body 820, which is elongate and generally tube-shaped. In one example, the float 804 may be topped by a flower or other aesthetic decoration that rises from the device 800 as the collection tube 802 fills with collected water. In yet other embodiment, the float 804 may also include one or more outward projections that fit between the interior projections 814 of the collection tube 802. This prevents the float 804 from rotating.

Figure 11:
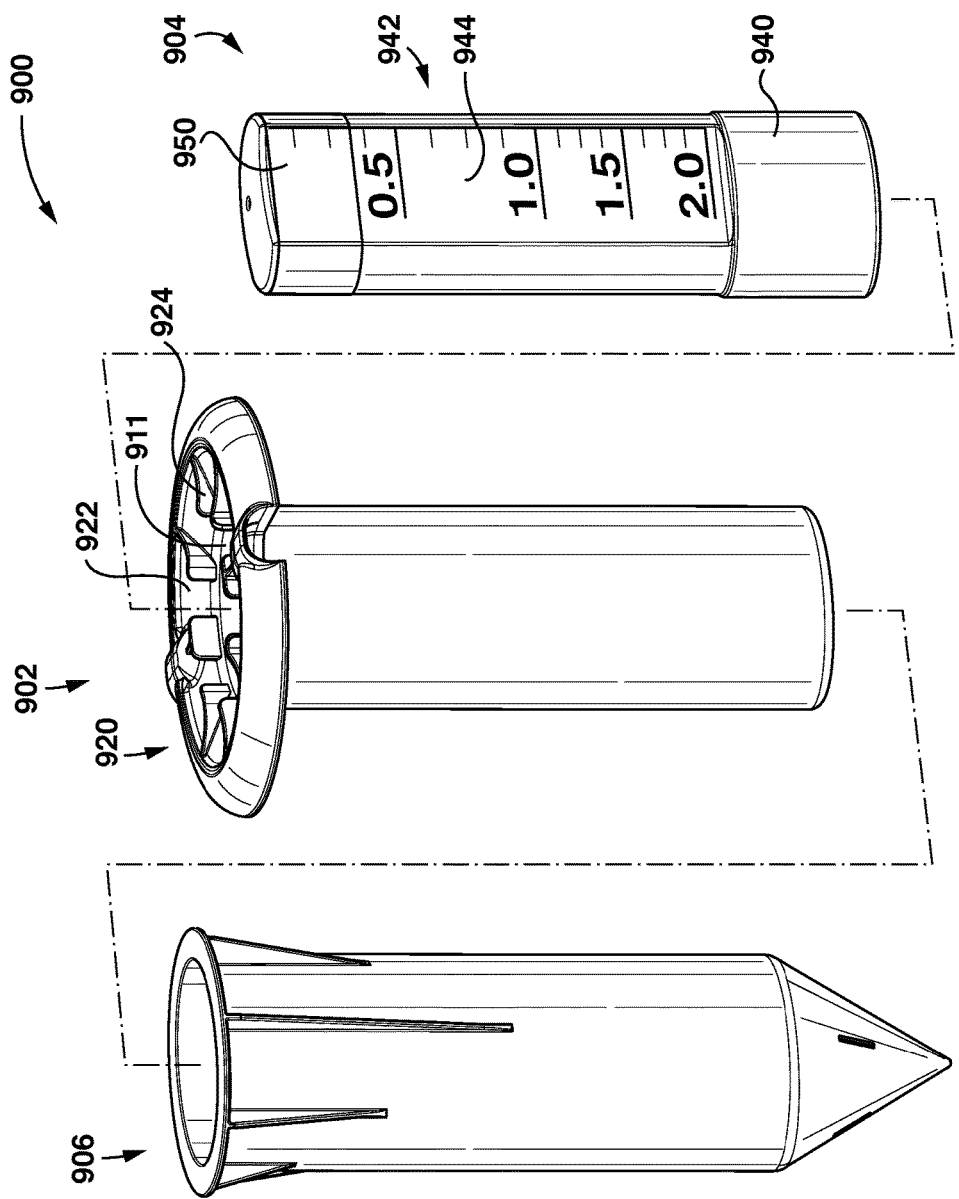
FIG. 11 shows another example embodiment of a water collection device.
Figure 12:
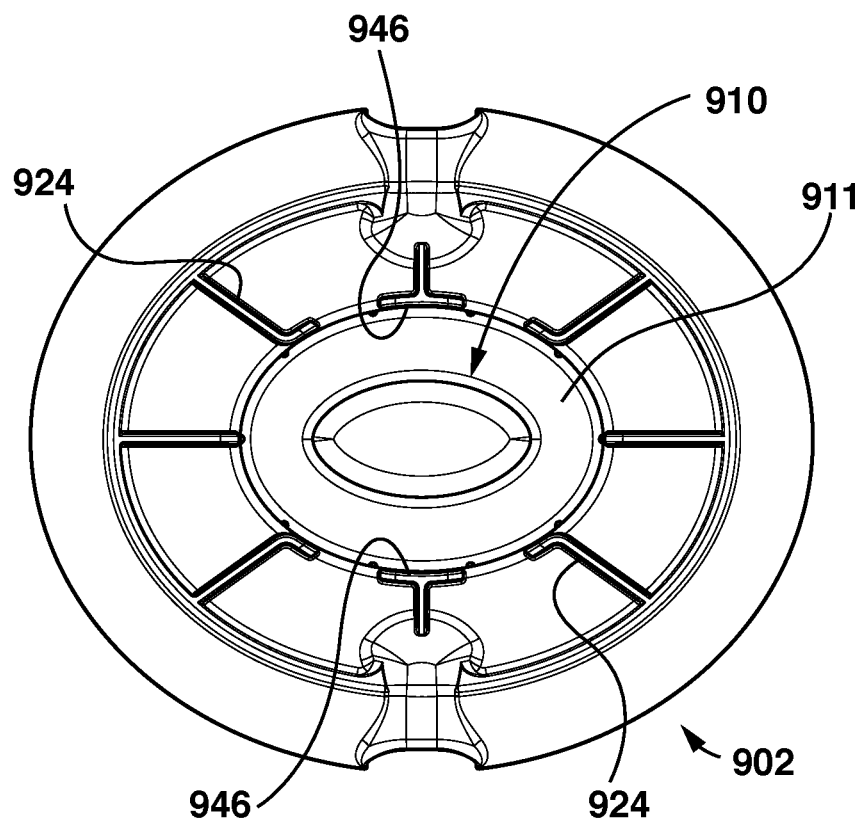
FIG. 12 shows a top view of the collection tube of FIG. 11.

Reference is now made to FIG. 11, which shows a perspective view of another embodiment of a water collection device 900, in a disassembled state. This example water collection device 900 is elliptical or oval-shaped. The water collection device 900 includes a collection tube 902, a float 904 and an insertion spike 906. Reference is also made to FIG. 12, which shows a top view of the collection tube 902.

In this example, the collection tube 902 include an interior projection 910 having a corresponding elliptical cross-sectional shape. The float 906 includes an elliptical central bore to fit over the interior projection 910 of the collection tube 902. The non-circular cross-sectional shape prevent rotation of the float 906, thereby ensuring that any markings on the exterior of the float 906 are oriented in a consistent direction for easy reading.

The float 906 in this example includes an elliptical bottom portion 940 and a top portion 942 with two substantially flat faces 944. The substantially flat faces 944 on the top portion 942 make the application of measurement indicia easier and facilities easier reading of the measurements.

The example collection tube 902 includes an upper end 920 within an open mouth 911 that is surrounded by an annular flared portion 922 to direct water into the open mouth 911. The annular flared portion 922 includes a plurality of ribs 924. The top edges of the ribs 924 are generally flush with the top end of the annular flared portion 922. Some of the ribs 924, such as those that project towards the substantially flat faces 944 of the float 904 may include a perpendicular wall 946. The perpendicular wall 946 has a top edge flush with the top of the annular flared portion 922 and helps provide a visual line against which to determine the measurement from the indicia on the float 904.

In this example, the water collection device 900 further includes a measurement sleeve 950. The measurement sleeve 950 fits around the top portion 942 of the float 904. The sleeve 950 may be sized to friction fit around the top portion 942 so that it stays in place once positioned. The measurement sleeve 950 may be constructed from lightweight plastic, e.g. polypropylene, and may be at least partially transparent so as to be able to discern the measurement marking behind the sleeve 950. The sleeve 950 may be adjustable in location on the top portion 942. That is, the sleeve 950 may be positioned at a desired quantity of irrigation. This enables a user to quickly visually assess whether the desired quantity of irrigation has been achieved, whether by rainfall or sprinklers. Accordingly, the user is able to quickly assess whether to initiate watering or to cease active watering. Because desired irrigation may differ depending on the soil conditions, plantings, time of year, and other factors, the sleeve 950 may be moved to a position on the float 904 that indicates the desired quantity of irrigation for a given situation.

Figure 13:
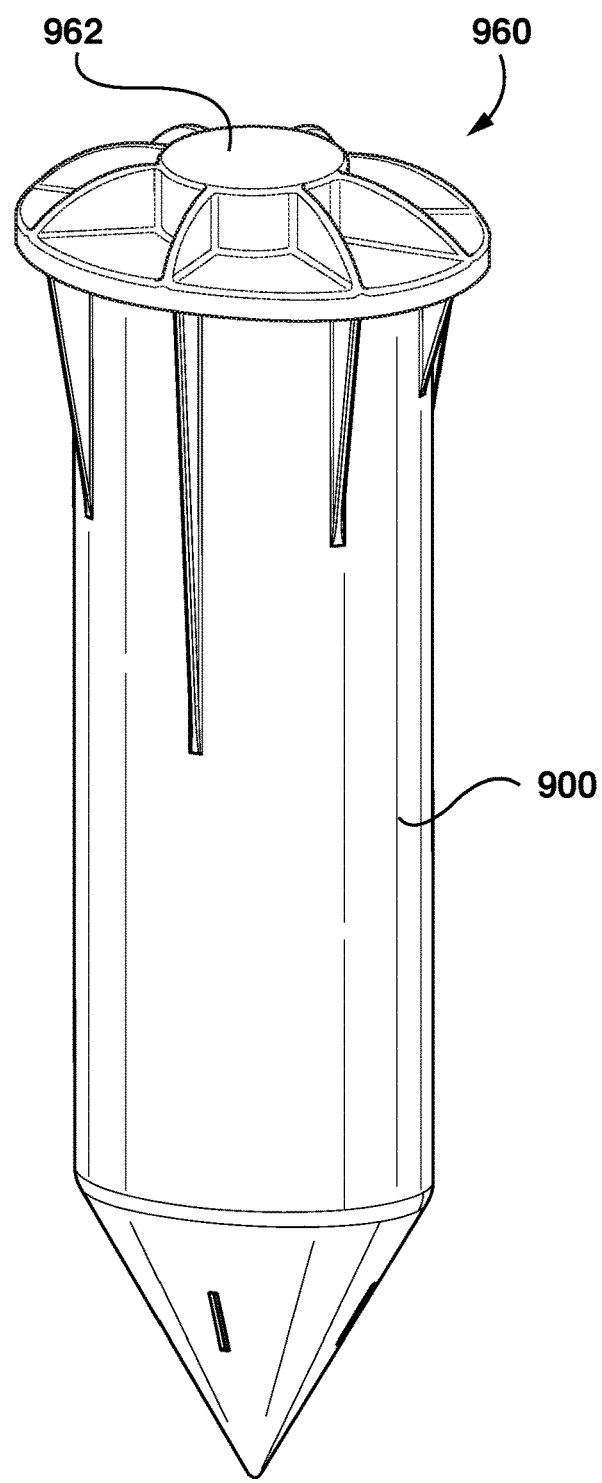
FIG. 13 shows a perspective view of an insertion spike with a plug.

Referring now to FIG. 13, in some embodiments, the water collection device further includes a plug 960 sized to seal the top end of the insertion spike 906 once the collection tube is removed, such as during winter, so as to prevent the insertion spike 906 from becoming clogged with debris. The plug may also be used during driving of the insertion spike 906 into the ground since it may lend structural integrity to the upper end of the spike 906 may provide a solid flat surface 962 for hammering.

Certain adaptations and modifications of the described embodiments can be made. Therefore, the above discussed embodiments are considered to be illustrative and not restrictive.

The invention claimed is:

1. A water collection device, the device comprising:
a collection tube having an inner wall, and having an open mouth at its upper end and a closed bottom end, the bottom end including an upwardly projecting sidewall defining an interior projection at least partly spaced apart from the inner wall of the collection tube, wherein the cross-sectional area between the inner wall and the upwardly projecting sidewall is smaller than the cross-sectional area of the open mouth; and
a float within the collection tube, the float having an upper end and a lower end, the lower end having an axial bore sized to fit over the interior projection defined by the upwardly projecting sidewall.

2. The device of claim 1, wherein the upper end of the collection tube is extended above the open mouth and is flared outward to form a funnel portion.

3. The device of claim 2, wherein the funnel portion comprises a disk-like plate, the plate having a perpendicular wall along its perimeter and having a greater cross-sectional area than the open mouth.

4. The device of claim 3, further comprising a filter screen disposed over the funnel portion.

5. The device of claim 1, wherein the interior projection has a top end and a base, and wherein the sidewall is sloped such that the cross-sectional area of the interior projection gradually increases from its top end to its base.

6. The device of claim 1, wherein an exterior surface of the float includes a plurality of graduated markings disposed between its upper end and its lower end to indicate an amount of water collected in the collection tube.

7. The device of claim 6, wherein the plurality of graduated markings are not evenly spaced apart.

8. The device of claim 1, further comprising a spike for insertion into soil, wherein the spike is a tube with a conical lower end and the tube adapted to receive insertion of the collection tube.

9. The device of claim 8, wherein the conical lower end of the tube contains one or more drainage holes.

10. The device of claim 1, wherein the collection tube is elliptical.

11. The device of claim 1, wherein the interior projection is elliptical and is centered with the ellipse formed by the inner wall of the collection tube.

12. The device of claim 10, wherein the float includes a top portion with at least two substantially flat faces.

13. The device of claim 1, further comprising a measurement sleeve sized to friction fit around a top portion of the float.

14. The device of claim 1, wherein the float includes a decorative character.

15. An in-ground water measurement device, comprising:
   an insertion spike including a tube with a closed conical lower end for insertion into soil;
   a collection tube sized to slide into the insertion spike and having an inner wall with an open mouth at its upper end and a closed bottom end, the bottom end including an upwardly projecting sidewall defining an interior projection at least partly spaced apart from the inner wall of the collection tube, wherein the cross-sectional area between the inner wall and the upwardly projecting sidewall is smaller than the cross-sectional area of the open mouth; and
   a buoyant float having an upper end and a lower end, the lower end having an axial bore sized to fit over the interior projection defined by the upwardly projecting sidewall, the buoyant float including measurement markings along its exterior surface to indicate the quantity of water in the collection tube.

16. The device of claim 15, wherein the upper end of the collection tube is extended above the open mouth and is flared outward to form a funnel portion to direct water into the open mouth.

17. The device of claim 16, wherein the funnel portion includes a plurality of inwardly-projecting ribs.

18. The device of claim 15, wherein the collection tube is elliptical.

19. The device of claim 18, wherein the interior projection is elliptical and is centered within the ellipse formed by the inner wall of the collection tube.

20. The device of claim 15, wherein the float includes a top portion with at least two substantially flat faces, and wherein the measurement markings are on the at least two substantially flat faces.

* * * * *